(12) United States Patent
Hirono (10) Patent No.: US 7,042,191 B2
(45) Date of Patent: May 9, 2006

(54) CURRENT DETECTION UNIT OF INVERTER

(75) Inventor: Daisuke Hirono, Isesaki (JP)

(73) Assignee: Sanden Corporation, Gunma (JP)

( * ) Notice: Subject to any disclaimer, the term of this patent is extended or adjusted under 35 U.S.C. 154(b) by 98 days.

(21) Appl. No.: 10/734,677

(22) Filed: Dec. 15, 2003

(65) Prior Publication Data

US 2004/0125622 A1    Jul. 1, 2004

(30) Foreign Application Priority Data

Dec. 25, 2002    (JP)    ............... 2002-373715

(51) Int. Cl.
*H02P 5/34*    (2006.01)

(52) U.S. Cl. .............. 318/801; 318/762; 318/798; 363/98

(58) Field of Classification Search ............ 363/36–41, 363/98, 132, 127, 97, 79, 81; 318/801, 809, 318/798, 807
See application file for complete search history.

(56) References Cited

U.S. PATENT DOCUMENTS

| | | | |
|---|---|---|---|
| 4,808,078 A | 2/1989 | Havens et al. | |
| 5,309,349 A * | 5/1994 | Kwan | .................. 363/98 |
| 5,436,547 A | 7/1995 | Nagai et al. | |
| 5,640,073 A | 6/1997 | Ikeda et al. | |
| 5,782,610 A | 7/1998 | Ikeda | |
| 6,049,474 A * | 4/2000 | Platnic | .................. 363/98 |
| 6,501,662 B1 | 12/2002 | Ikeda | |
| 6,646,411 B1 * | 11/2003 | Hirono et al. | .............. 318/801 |
| 2004/0104704 A1 | 6/2004 | Hirono | |
| 2004/0124808 A1 | 7/2004 | Hirono | |

FOREIGN PATENT DOCUMENTS

| | | |
|---|---|---|
| JP | 2563226 | 9/1996 |
| JP | 10155278 | 6/1998 |
| JP | 2000350489 | 12/2000 |
| JP | 2001251889 | 9/2001 |
| JP | 2001268974 | 9/2001 |
| JP | 2002186171 | 6/2002 |

* cited by examiner

*Primary Examiner*—Rajnikant B. Patel
(74) *Attorney, Agent, or Firm*—Baker Botts, LLP

(57) ABSTRACT

A current detection unit of an inverter outputs currents to a load, such as a motor includes a device for measuring a DC current flowing in the inverter. The current detection unit also includes a measurement time setting device for setting a measurement time of power source currents at at least one of an uppermost point and a lowest point of a reference chopping wave with a predetermined frequency, and a current phase detection means for detecting at least two phase currents from respective power source currents measured at two or more measurement times sequential to each other. A phased current output from the inverter to a load, such as a motor, may be detected with a high degree of accuracy and at a constant period.

9 Claims, 7 Drawing Sheets

CURRENT DETECTION UNIT OF INVERTER

BACKGROUND OF THE INVENTION

1. Field of the Invention

The present invention relates to a current detection unit of an inverter which outputs a pseudo three-phase AC power, converted from a DC power by pulse width modulation control (hereinafter "PWM control") by a chopping wave comparison method. The inverter outputs the AC power to a load, such as a motor or a transformer. More specifically, the invention relates to a current detection unit which detects a three-phase current output from the inverter to the load by measuring a DC current flowing in the inverter.

2. Description of Related Art

Figure 1:
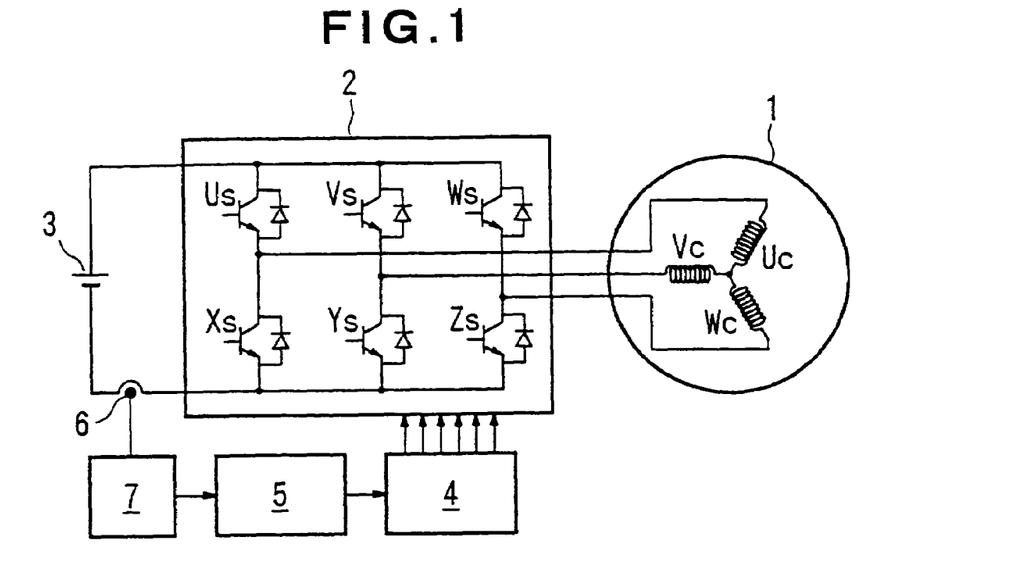
FIG. 1 is a schematic circuit diagram showing an example of a motor control unit using an inverter.

FIG. 1 depicts an example of a known motor control unit using an inverter. In FIG. 1, a three-phase current is applied from an inverter 2 to a three-phase, brushless motor 1. A DC current is applied to inverter 2 from a DC power source 3. Inverter 2 is driven by a drive unit 4, and drive unit 4 is controlled by a control unit 5. The DC current applied to inverter 2 is detected by a DC current sensor 6, and the detected signal is sent to control unit 5 through an A/D converter 7.

Inverter 2 has three pairs of switching elements Us, Xs, Vs, Ys, Ws, and Zs, each comprising a transistor and the like. Us, Vs, and Ws are upper switching elements; and Xs, Ys, and Zs are lower switching elements. Through on/off control of the respective switching elements; in response to the PWM signals from drive unit 4, inverter 2 converts the DC power sent from DC power source 3 into a pseudo three-phase AC power and outputs the AC power to respective coil phases Uc, Vc, and Wc of motor 1. DC current sensor 6 is provided for measuring a DC current flowing in the power source wire of inverter 2 (hereinafter "power source current Idc"), and the measurement signal thereof is input to control unit 5 after that signal is A/D converted at A/D converter 7.

Three pairs of switching elements of inverter 2 are on/off controlled in response to PWM signals from control unit 4, and the on/off conditions may be classified into eight (8) configurations depicted in FIGS. 2A to 2H. In FIGS. 2A to 2H, each switching element is depicted as a simple switch for better understanding of the on/off condition control. Further, in FIGS. 2A to 2H, Idc indicates a power source current, Iu indicates a U-phase current output to U-phase coil Uc of motor 1, Iv indicates a V-phase current output to V-phase coil Vc of motor 1, and Iw indicates a W-phase current outputted to W-phase coil Wc of motor 1, respectively.

Figure 2A:
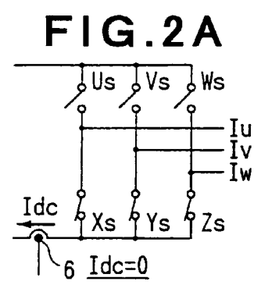
FIGS. 2A–2H are schematic circuit diagrams showing switching conditions of an inverter of the motor control unit depicted in FIG. 1.

In the configuration depicted in FIG. 2A, because Xs, Ys, and Zs are ON and Us, Vs, and Ws are OFF, power source current Idc becomes zero. In the configuration depicted in FIG. 2B, because Us, Ys, and Zs are ON and because Xs, Vs, and Ws are OFF, power source current Idc becomes Idc=Iu (=−Iv−Iw). In the configuration depicted in FIG. 2C, because Xs, Vs, and Zs are ON and because Us, Ys, and Ws are OFF, power source current Idc becomes Idc=Iv (=−Iu−Iw). In the configuration depicted in FIG. 2D, because Us, Vs, and Zs are ON and because Xs, Ys, and Ws are OFF, power source current Idc becomes Idc=Iu+Iv (=−Iw). In the configuration depicted in FIG. 2E, because Xs, Ys, and Ws are ON and Us, Vs, and Zs are OFF, power source current Idc becomes Idc=Iw (=−Iu−Iv). In the condition depicted in FIG. 2F, because Us, Ys, and Ws are ON and because Xs, Vs, and Zs are OFF, power source current Idc becomes Idc=Iw+Iu (=−Iv). In the configuration depicted in FIG. 2G, because Xs, Vs, and Ws are ON and because Us, Ys, and Zs are OFF, power source current Idc becomes Idc=Iv+Iw (=−Iu). In the configuration depicted in FIG. 2H, because Us, Vs, and Ws are ON and because Xs, Ys, and Zs are OFF, power source current Idc becomes zero.

Figure 2B:
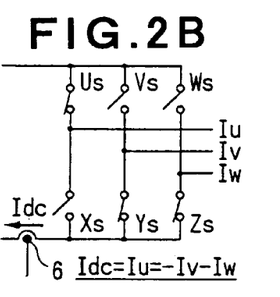
Figure 2C:
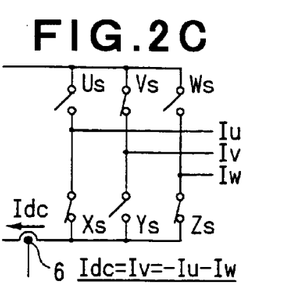
Figure 2D:
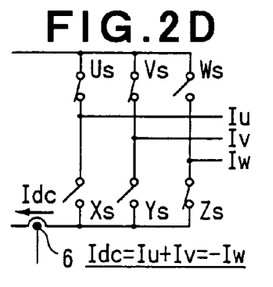
Figure 2E:
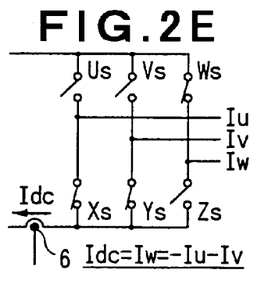
Figure 2F:
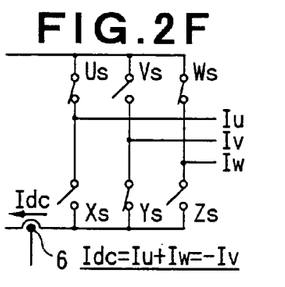
Figure 2G:
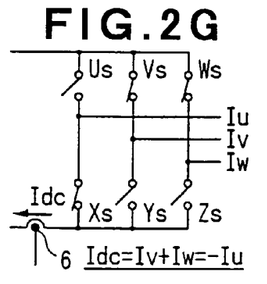
Figure 2H:
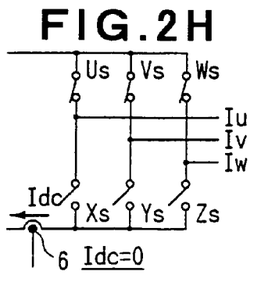

Specifically, by measuring the power source current Idc in the respective conditions, except the conditions depicted in FIGS. 2A and 2H, Iu in the conditions depicted in FIGS. 2B and 2G, Iv in the conditions depicted in FIGS. 2C and 2F, and Iw in the conditions depicted in FIGS. 2D and 2E, are obtained as respective phase currents, respectively. Therefore, three phase currents Iu, Iv, and Iw may be determined by measuring power source current Idc under either of two variations on each of three configurations of FIG. 2B or 2G, FIG. 2C or 2F, and FIG. 2D or 2E.

Figure 3:
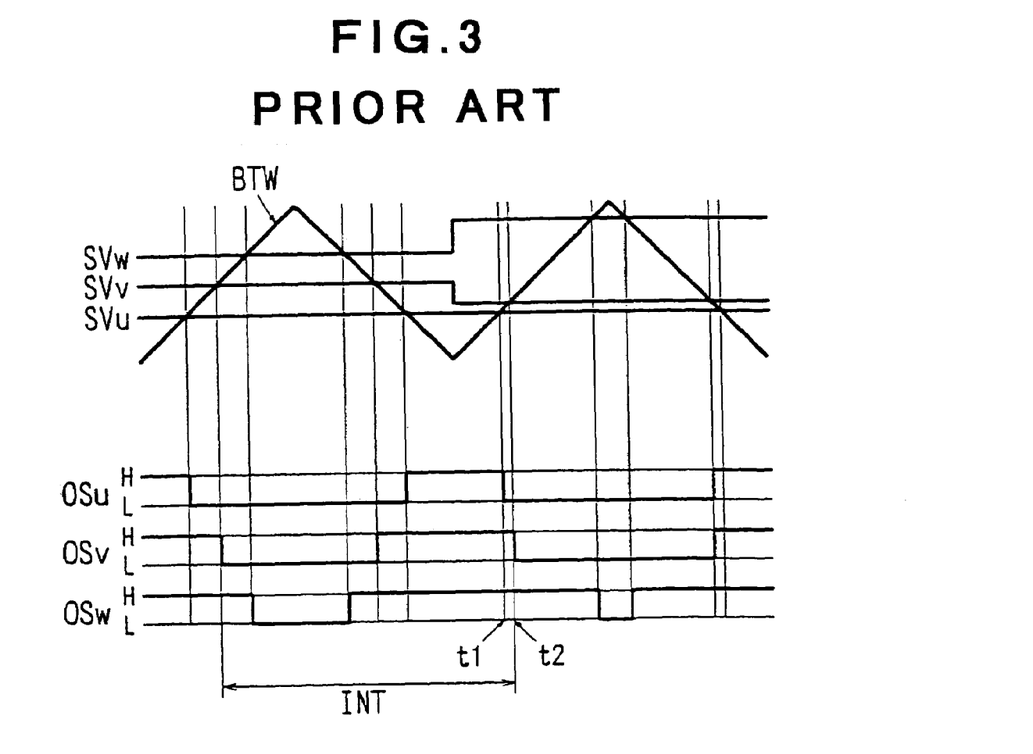
FIG. 3 is a timing chart showing a known method for detecting a current.

The timing chart depicted in FIG. 3 shows a known current detection method based on the above-described concept (for example, Japanese Patent No. 2,563,226 or JP-A-10-155278). In FIG. 3, BTW indicates a reference chopping wave with a predetermined frequency, SVw indicates a comparison reference signal for setting a W-phase output, SVv indicates a comparison reference signal for setting a V-phase output, and SVu indicates a comparison reference signal for setting a U-phase output. Similarly, OSu indicates a U-phase output set by reference chopping wave BTW and comparison reference signal SVu, OSv indicates a V-phase output set by reference chopping wave BTW and comparison reference signal SVv, and OSw indicates a W-phase output set by reference chopping wave BTW and comparison reference signal SVw.

In this current detection method, power source current Idc is measured at a time corresponding to one switching condition among the above-described conditions depicted in FIGS. 2B to 2G, and one phase current is detected. The power source current Idc is measured at a time corresponding to a switching condition different from the above-described switching condition, and another phase current different from the above-described phase current is detected. The remaining, one phase current is calculated from the detected, two phase currents, thereby accomplishing the desired current detection.

In the above-described, known current detection method, however, because power source current Idc is measured basically at a time at which the switching condition is switched, as shown in FIG. 3, when two measurement times t1 and t2 are close to each other, it may be difficult to measure the power source current Idc at the first measurement time t1.

Figure 4:
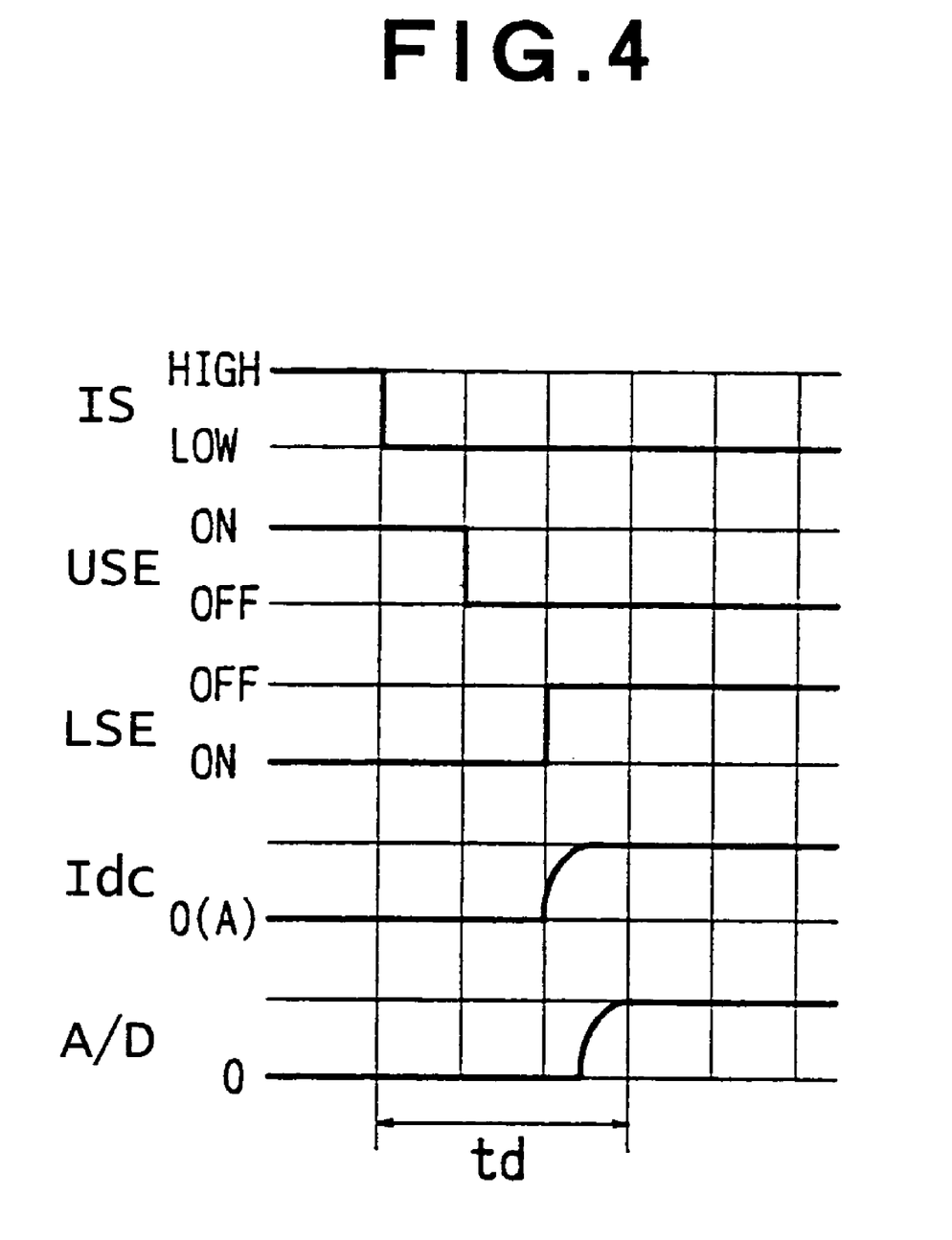
FIG. 4 is a diagram showing a time interval for measuring a current.

Specifically, as shown in FIG. 4, in a case in which a signal Is for switching the on/off condition of an arbitrary pair of switching elements is sent from drive unit 4 to inverter 2, an upper switching element USE is switched from ON to OFF at a time later than a time at which the signal is switched from a high level to a low level, a lower switching element LSE is switched from a low level to a high level at a time later than the above-described time, and as a result of this switching operation, the power source current Idc varies. Further, because the measurement signal of DC current sensor 6, which comprises a resistance and the like, is output to control unit 5 after being A/D converted by A/D converter 7, a time delay occurs in obtaining the A/D converted output (shown as "A/D" in FIG. 4) and accompanies the variation of the power source current Idc. Because the time td shown in FIG. 4 becomes about on and one half micro (1.5μ) seconds in the situation in which a general insulated, gate bipolar transistor (IGBT) element is used as a switching element, a time interval of at least about td is required between measurement times t1 and t2 in order to accurately measure the power source current Idc at measurement time t1. Therefore, when the time difference between measurement times t1 and t2 are less than the time td shown in FIG. 4, even if the power source current Idc is measured at measurement time t1, the measured value may include an error.

Further, in the above-described, known, current detection method, because the power source current Idc is measured at a time at which the switching condition is switched, if the duty ratios of the respective phase outputs vary, the measurement interval INT shown in FIG. 3 increases or decreases, and, therefore, it may be difficult to obtain phase current information over a consistent measurement period.

SUMMARY OF THE INVENTION

Accordingly, it is an object of embodiments of the present invention to provide a current detection unit of an inverter, which accurately obtains information of a phase current, which is output from an inverter to a load, such as a motor, at a consistent measurement period.

A current detection unit of an inverter according to the present invention is disclosed herein. The current detection unit of an inverter has an inverter that outputs a pseudo three-phase AC power, converted from a DC power by PWM control due to chopping wave comparison method, to a load, such as a motor or a transformer, and means for measuring a DC current (e.g., an ammeter) flowing in the inverter. The current detection unit detects a three-phase current output from the inverter to the load by measuring the DC current flowing in the inverter. The current detection unit comprises a measurement time setting means (e.g., a clock) for setting a measurement time of the DC current at at least one of an uppermost point and a lowest point of a reference chopping wave with a predetermined frequency; and a phase current detection means for detecting at least two phase currents from respective DC currents measured at two or more measurement time, one subsequent to the other.

In an embodiment of the current detection unit, the current detection unit further may comprise a phase output setting means for setting a three-phase output wherein one phase is set fixedly at a low level or a high level, another phase is set at an active-high setting and a remaining phase is set at an active-low setting.

In another embodiment of the current detection unit, the current detection unit further may comprise a phase output setting means for setting a three-phase output wherein one phase is set at one of an active-high setting and an active-low setting, and the other two phases are set at the other of the active-high setting and the active-low setting.

In a further embodiment of the current detection unit, the phase current detection means may measure a DC current at two measurement times, one subsequent to the other, detects one phase of current from a current measured at one of the two measurement times, and detects another phase of current from a current measured at the other measurement time.

In a still further embodiment of the current detection unit, the current phase detection means may measure a DC current at three or more measurement times sequential to each other, and estimates phase currents, which is not detected by predetermined measurement times, based on currents measured at the respective measurement times.

In the current detection unit of an inverter according to the present invention, the current phase detection means may determines a phase of current, which is not measured at a predetermined measurement times, by inverting at least one phase output at the predetermined measurement time.

Further, in the current detection unit of an inverter according to the present invention, by inverting at least one phase output at three measurement times sequential to each other, the current phase detection means may determine a phase current, which may not be measured at a central or second measurement time.

In the above-described current detection unit of an inverter according to the present invention, by setting a measurement time of the DC current at at least one of an uppermost point and a lowest point of a reference chopping wave with a predetermined frequency, the measurement of current may be accomplished at a center in the relatively high level zone or a center in the relatively low level zone in each phase output. Therefore, even if the measurement times are set at all of the uppermost points and all of the lowest points of the reference chopping wave, a time difference sufficient to enable the measurement of current may be ensured between two measurement times sequential to each other. Consequently, even if the power source current is measured at the respective measurement times, the measured values may not generate errors, and the respective phase currents may be detected with a high degree of accuracy.

Further, because the measurement time of the DC current is set at at least one of an uppermost point and a lowest point of a reference chopping wave with a predetermined frequency, even if the duty ratio of each phase output varies, the measurement time may not vary. Therefore, the phase current may be detected by measuring the power source current at a constant period according to the frequency of the reference chopping wave. By carrying out the measurement of phase current at a constant period, the stability for driving a load by the inverter may be improved.

Further objects, features, and advantages of embodiments of the present invention will be understood from the following detailed description of preferred embodiments of the present invention with reference to the accompanying figures.

BRIEF DESCRIPTION OF THE DRAWINGS

Embodiments of the invention now are described with reference to the accompanying figures, which are given by way of example only, and are not intended to limit the present invention.

DETAILED DESCRIPTION OF PREFERRED EMBODIMENTS

A motor control unit including the present invention may have substantially the same circuit structure as that depicted in FIG. 1, except for operation for detection of current in control unit 5. Therefore, the same names and labels as those used in the explanation of FIG. 1 will be used in the following explanation, as needed.

Figure 5:
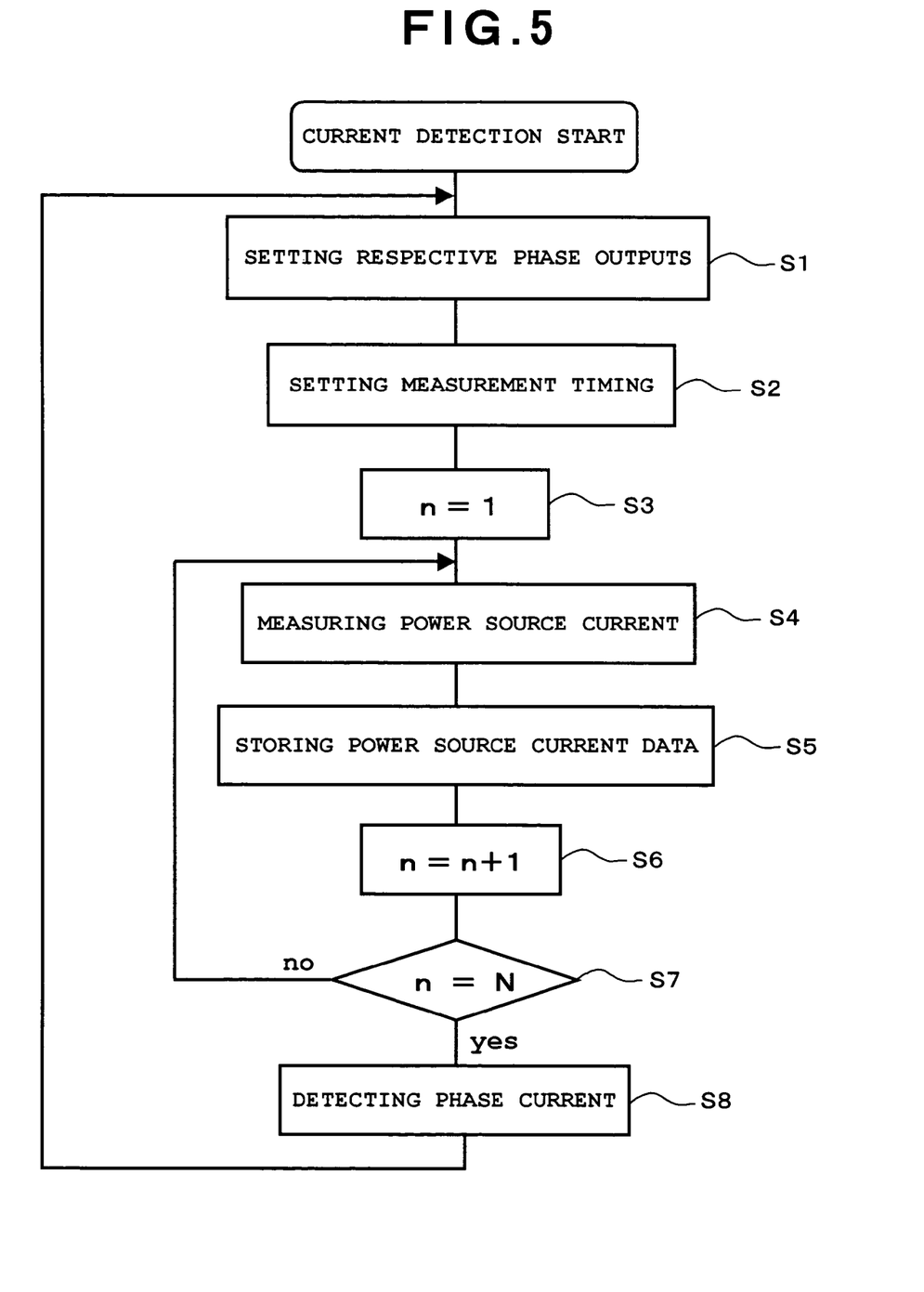
FIG. 5 is a flow chart showing a detection of current according to an embodiment of the present invention.

The detection of current according to the present invention may be carried out based on the flow chart depicted in FIG. 5. First, respective phase outputs OSu, OSv, and OSw are set using a reference chopping wave BTW and respective comparison reference signals SVu, SVv, and SVw (step S1). A measurement time (measurement times) is (are) then set (step S2). Power source current Idc is measured at the set measurement time (step S4), the power source current data after A/D conversion is stored (step S5), and these operations are repeated until such time that the incremented number of repeated measurement times "n" reaches a set number of measurement times "N" (steps S3–S7). When the number of the measurement times "h" reaches the set number of measurement times "N," a phase current is detected based on the stored data (step S8). Thus, the detection of current may be accomplished.

Figure 6:
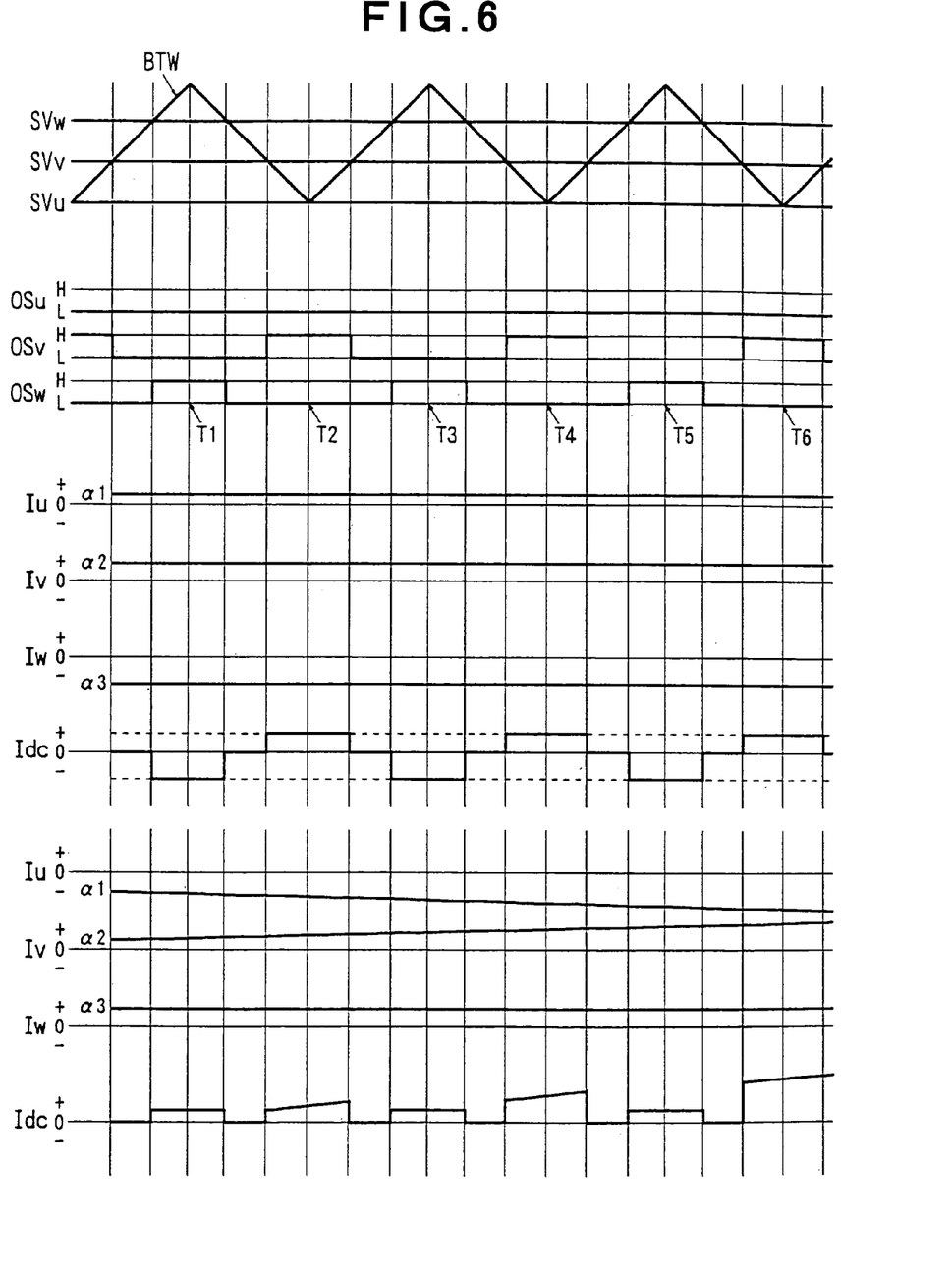
FIG. 6 is a timing chart showing a detection of current according to an embodiment of the present invention.

An embodiment of the detection of current now is explained referring to a timing chart depicted in FIG. 6.

First, using a reference chopping wave BTW with a predetermined frequency, a comparison reference signal SVw for setting a W-phase output, a comparison reference signal SVv for setting a V-phase output, and a comparison reference signal SVu for setting a U-phase output are determined relative to the reference chopping wave BTW. In this embodiment, in order to accomplish so-called PWM control due to two phase modulation wherein one of the three-phase outputs is fixed at a low level or a high level, the comparison reference signal SVu for setting the U-phase output is set at the lowest point of the reference chopping wave BTW.

Next, U-phase output OSu, V-phase output OSv, and W-phase output OSw are set by a chopping wave comparison method. As aforementioned, because the comparison reference signal SVu for setting the U-phase output is set at the lowest point of the reference chopping wave BTW, U-phase output OSu is fixed at a low level. V-phase output OSv is set, so that it reaches a low level when the reference chopping wave BTW is greater than comparison reference signal SVv, and V-phase output OSv reaches a high level when the reference chopping wave BTW is less than comparison reference signal SVv. W-phase output OSw is set, so that it reaches a high level when the reference chopping wave BTW is greater than comparison reference signal SVw, and W-phase output OSw reaches a low level when the reference chopping wave BTW is less than comparison reference signal SVw. Hereinafter, an output setting method, such as setting of V-phase output OSv, is referred to as "active-low setting," and an output setting method, such as setting of W-phase output OSw, is referred to as "active-high setting."

After respective phase outputs OSu, OSv, and OSw are set thus, voltages are applied to respective coil phases Uc, Vc, and Wc of three-phase, brushless motor 1, according to the respective phase outputs OSu, OSv, and OSw. Then, measurement times T1–T6 are set in chronological sequence to all of the uppermost points and all of the lowest points of reference chopping wave BTW, and power source current Idc is measured at two measurement times T1 and T2 sequential to each other in the first period. The measurement signals of DC current sensor 6 at respective measurement times T1 and T2 are A/D converted by A/D converter 7, and thereafter, these signals are stored as power source current data at the respective measurement times T1 and T2 in a memory (not shown) in control unit 5.

Because U-phase output OSu and V-phase output OSv are low levels, and because W-phase output OSw is high level at measurement timing T1, power source current Idc measured at the measurement time T1 becomes Idc=Iw (W-phase current), and the measurement of current at that time is accomplished at a center of the high level interval of W-phase output OSw. Further, because U-phase output OSu and W-phase output OSw are at low levels and because V-phase output OSv is high level at measurement time T2, power source current Idc measured at measurement time T2 becomes Idc=Iv (V-phase current), and the measurement of current at that time is accomplished at a center of the high level interval of V-phase output OSv.

Next, respective phase currents Iu, Iv, and Iw are detected based on the power source current data stored in the memory. Because a chopping wave with a relatively high frequency in a range of about 5 kHz to about 20 kHz generally is used as a reference chopping wave BTW for PWM control, in this embodiment, measurement times T1 and T2 may be treated as a occurring at substantially the same time, and respective phase currents Iu, Iv, and Iw are detected at that time.

As described above, because power source current Idc measured at the measurement time T1 is W-phase current Iw and because power source current Idc measured at the measurement time T2 is V-phase current Iv, it is not necessary to determine W-phase current Iw and V-phase current Iv by calculation. Further, because the sum of U-phase current Iu, V-phase current Iv, and W-phase current Iw always is zero, the remaining U-phase current Iu may be derived from the equation of Iu+Iv+Iw=0 as the equation of Iu=−Iv−Iw.

Because the number of setting times "N" in step S7 depicted in FIG. 5 is set at two (2), power source current Idc is measured successively at two measurement times T3 and T4 sequential to each other in the next period, and in a similar manner described above, the measurement times T3 and T4 may be treated as a substantially the same time interval, and respective phase currents Iu, Iv, and Iw at the time are detected. Hereinafter, similar detection of current is continued. In motor drive control due to PWM control, because there is also a control method in which only two currents among respective phase currents Iu, Iv, and Iw may be detected, and only these two currents may be used, in such a control method, it is not necessary to determine the remaining phase current Iu in a control state in which two phase currents Iv and Iw have been detected or determined.

Thus, according to the above-described detection of current, by setting measurement times T1–T6 of power source current Idc at all of the uppermost points and all of the lowest points of reference chopping wave BTW with a predetermined frequency, the measurement of current may be accomplished at a center in the high level interval or a center in the low level interval in V-phase output OSv and W-phase output OSw, a sufficient time may be ensured to avoid difficulty in measuring current between two times sequential to each other, for example, between measurement times T1 and T2. Moreover, because the measurement of current may be accomplished at a center in the high level interval or a center in the low level interval in V-phase output OSv and W-phase output OSw, pulsation of current due to PWM control also may be minimized. Therefore, even if power source current Idc is measured at the respective measurement times, the measured value may avoid errors due to insufficient separation between measurement times or pulsation of current or the like, thereby detecting respective phase currents Iu, Iv, and Iw with a high degree of accuracy.

Further, because measurement times T1–T6 of power source current Idc are set at all of the uppermost points and all of the lowest points of reference chopping wave BTW with a predetermined frequency, even if the duty ratios of V-phase output OSv and W-phase output OSw vary, the measurement timings may not vary. Therefore, the phase current may be detected by measuring the power source current at a constant period according to the frequency of reference chopping wave BTW. By carrying out the measurement of phase current at a constant period, the stability of motor drive control due to inverter 2 may be improved.

Although the detection of current is shown in the above-described embodiment wherein, from W-phase current Iw and V-phase current Iv measured at two measurement times sequential to each other, U-phase current Iu which may not be measured at both measurement times, is determined, as respective phase currents Iu, Iv, and Iw shown in the central portion of FIG. 6. In a situation in which the respective phase currents Iu, Iv, and Iw do not vary or the variations are very small relative to the phase current in one period or over a plurality of continuous periods of reference chopping wave BTW, it is possible to estimate a phase current, which may not be measured at a predetermined detection time, based on power source current Idc measured at three measurement times sequential to each other over a one and one-half (1.5) period of reference chopping wave BTW. For example, when W-phase current Iw(T2), which may not be measured at measurement time T2, is estimated, the W-phase current Iw at measurement timing T2 may be determined by the equation: Iw(T2)=(Iw(T1)+Iw(T3))/2 from W-phase current Iw(T1) measured at measurement time T1 and W-phase current Iw(T3) measured at measurement time T3.

Further, it is possible to estimate a phase current, which may not be measured at a predetermined detection time, based on power source currents Idc at four measurement times sequential to each other over two periods of reference chopping wave BTW. For example, when W-phase current Iw(T4), which may not be measured at measurement timing T4, is estimated, the W-phase current Iw at measurement timing T4 may be determined from an equation of Iw(T4)=Iw(T3)+(Iw(T3)−Iw(T1))/2 from W-phase current Iw(T1) measured at measurement time T1 and W-phase current Iw(T3) measured at measurement time T3.

Similar to the above-described method, a phase current, which may not be measured at a predetermined detection time may be estimated, based on power source currents Idc at five or more measurement times sequential to each other over two and one-half (2.5) or more periods of reference chopping wave BTW.

On the other hand, as with respective phase currents Iu, Iv, and Iw shown in the lower portion of FIG. 6, when the respective phase currents Iu, Iv, and Iw vary in one or a plurality of continuous periods of reference chopping wave BTW, although the above-described estimations may be possible, the following method may obtain a more accurate value. For example, W-phase current Iw(T2) at measurement time T2 is estimated by the equation: Iw(T2)=(Iw(T1)+Iw(T3))/2 from W-phase current Iw(T1) measured at measurement time T1 and W-phase current Iw(T3) measured at measurement time T3, W-phase current Iw(T4) at measurement time T4 is estimated by the equation: Iw(T4)=(Iw(T3)+Iw(T5))/2 from W-phase current Iw(T3) measured at measurement time T3 and W-phase current Iw(T5) measured at measurement time T5, and W-phase current Iw(T3) at measurement time T3 is estimated by the equation: Iw(T3)=(Iw(T2)+Iw(T4))/2 based on estimated, W-phase current Iw(T2) at measurement time T2 and estimated W-phase current Iw(T4) at measurement time T4.

Figure 7:
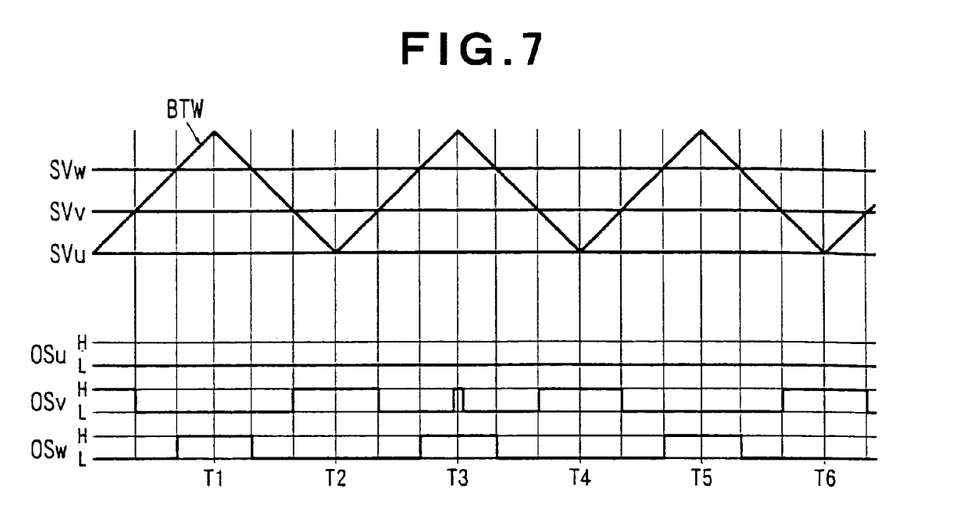
FIG. 7 is a timing chart showing a detection of current according to a modification of the embodiment depicted in FIG. 6.

FIG. 7 depicts a timing chart showing a modification of the timing chart depicted in FIG. 6. In the timing chart depicted in FIG. 7, when power source current Idc is measured at measurement time T3, V-phase output OSv is momentarily turned to high level, and the measurement of current is carried out at a center of this high level interval. In this discussion, "momentarily" means a time interval greater than two (2) times the interval of time necessary for measurement of current, which is previously explained using FIG. 4, for example, more than about three micro (3μ) seconds, from the condition in which the measurement of current is accomplished at a center of the high level interval. Specifically, although power source current Idc measured at measurement time T3 is W-phase current Iw in the timing chart depicted in FIG. 6, U-phase current Iu my be measured at the same measurement time T3 by momentarily inverting V-phase output OSv to high level when power source current Idc is measured at measurement time T3, as depicted in FIG. 7.

Therefore, if power source current Idc is measured at three measurement times T1, T2, and T3, because W-phase current Iw may be measured at measurement time T1, V-phase current Iv may be measured at measurement time T2 and U-phase current Iu may be measured at measurement time T3, respectively, respective phase currents Iu, Iv, and Iw at a time, determined by treating the measurement times T1, T2 and T3 as identical, may be detected without calculation. Of course, a phase current, which may not be measured at another measurement time, may be measured by inverting at least one phase output at the measurement time.

Figure 8:
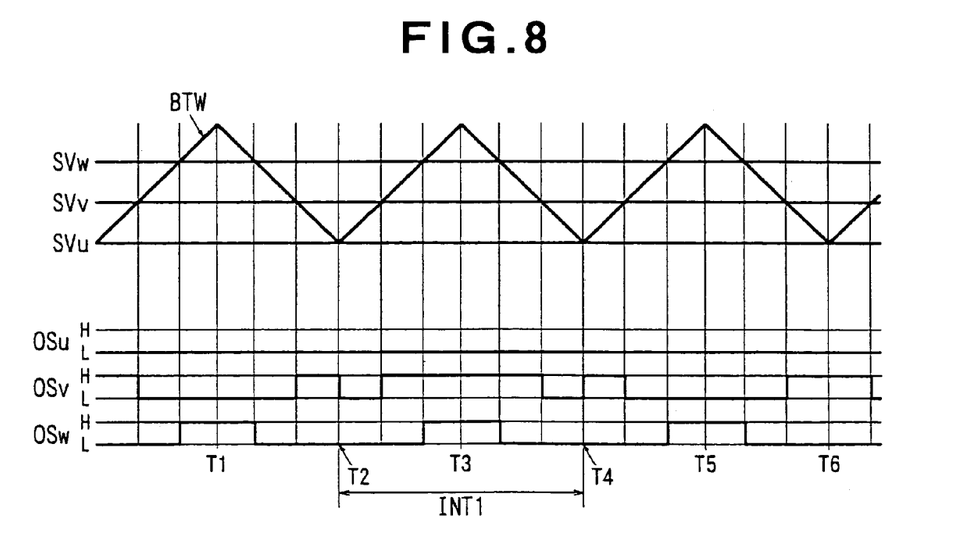
FIG. 8 is a timing chart showing a detection of current according to another modification of the embodiment depicted in FIG. 6.

FIG. 8 depicts a timing chart showing another modification of the timing chart depicted in FIG. 6. In the timing chart depicted in FIG. 8, V-phase output OSv is inverted during an interval INT1 between measurement time T2 and T4 by active-high setting. Specifically, although power source current Idc measured at measurement time T3 is W-phase current Iw in the timing chart depicted in FIG. 6, U-phase current Iu may be measured at the same measurement time T3 by V-phase output OSv to a high level when power source current Idc is measured at measurement time T3, as depicted in FIG. 8.

Therefore, if power source current Idc is measured at three measurement times T1, T2, and T3, because W-phase current Iw may be measured at measurement time T1, V-phase current Iv may be measured at measurement time T2 and U-phase current Iu may be measured at measurement time T3, respectively, respective phase currents Iu, Iv, and Iw at a time, determined by treating the measurement times T1, T2, and T3 as identical, may be detected without calculation.

Figure 9:
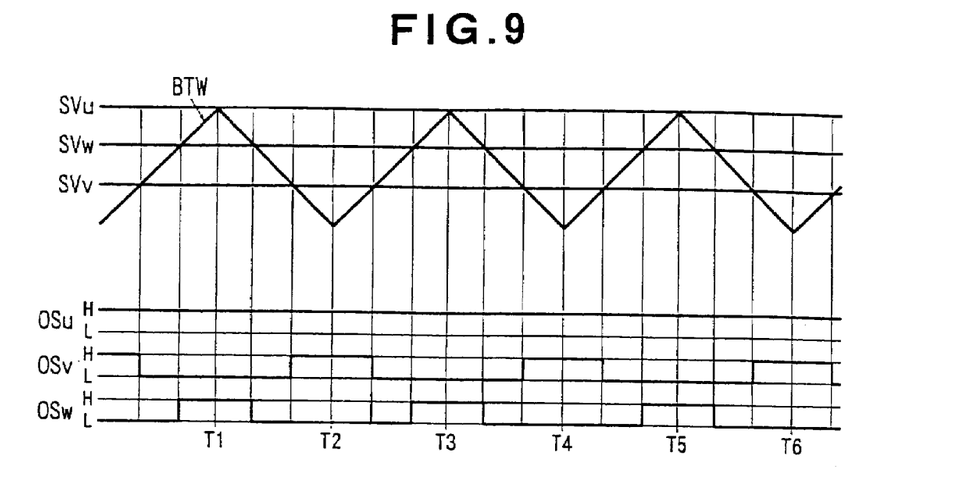
FIG. 9 is a timing chart showing an example in which a U-phase output is fixed at a higher level in the embodiment depicted in FIG. 6.

Although the detection of current depicted in FIG. 6 shows a detection in a two-phase modulation condition in which U-phase output OSu is fixed at low level, as depicted in FIG. 9, even in a case in which a two-phase modulation fixing U-phase output OSu at high level is accomplished in a condition in which comparison reference signal SVu for setting the U-phase output is set at an uppermost point of reference chopping wave BTW. Because V-phase current Iv may be measured at measurement times T1, T3, and T5 and because W-phase current Iw may be measured at measurement times T2, T4, and T6, a method of current detection similar to that shown in FIG. 6 may be accomplished. Further, if W-phase output is momentarily inverted to low level when power source current Idc is measured at measurement time T3 in FIG. 9, a method of current detection similar to that shown in FIG. 7 may be accomplished by measuring U-phase current Iu at the measurement time T3. Moreover, if W-phase output OSw in a interval INT1 between measurement times T2 and T4 in FIG. 9 is set to be active-low setting and if the W-phase output OSw is inverted to low level when power source current Idc is measured at measurement time T3, a method of current detection similar to that shown in FIG. 8 may be accomplished by measuring U-phase current Iu at the measurement time T3.

Although methods for detecting current explained with reference to FIGS. 5–9 are based on PWM control due to two phase modulation, the above-described detection of current may be applied to PWM control due to three phase modulation. Hereinafter, an embodiment is explained referring to a timing chart depicted in FIG. 10.

Figure 10:
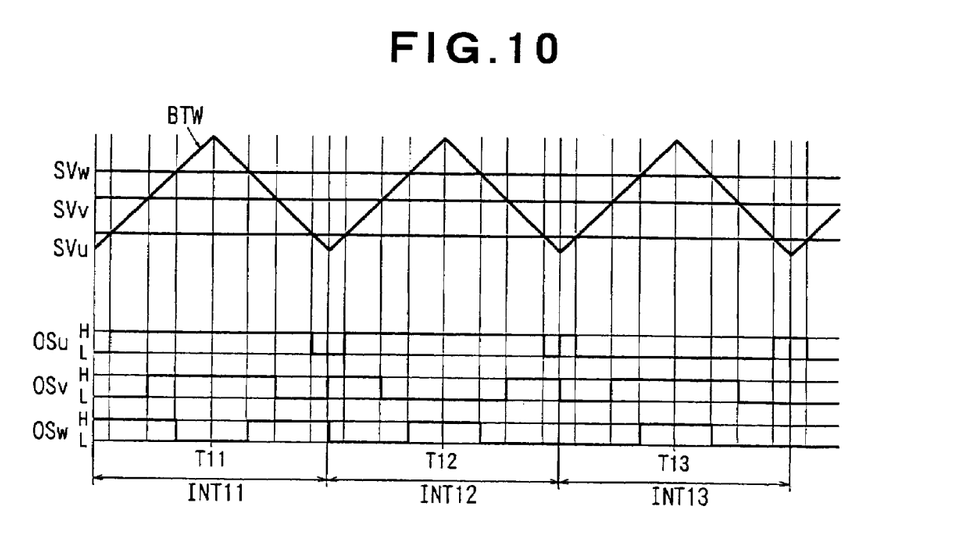
FIG. 10 is a timing chart showing a detection of current according to another embodiment of the present invention.

First, using a reference chopping wave BTW with a predetermined frequency, comparison reference signal SVw for setting a W-phase output, comparison reference signal SVv for setting a V-phase output and comparison reference signal SVu for setting a U-phase output are determined.

Next, U-phase output OSu, V-phase output OSv, and W-phase output OSw are set by chopping wave comparison method. In FIG. 10, INT11 indicates a first period between the first lowest point and the second lowest point of reference chopping wave BTW from the left side, INT12 indicates a second period between the second lowest point and the third lowest point of reference chopping wave BTW from the left side, and INT13 indicates a third period between the third lowest point and the fourth lowest point of reference chopping wave BTW from the left side. As depicted in figure, in first period INT11, U-phase output OSu is set at an active high setting, V-phase output OSv is set at an active high setting, and W-phase output OSw is set at an active low setting. In second period INT12, U-phase output OSu is set at an active high setting, V-phase output OSv is set at an active low setting, and W-phase output OSw is set at an active high setting. In third zone INT13, U-phase output OSu is set at an active low setting, V-phase output OSv is set at an active high setting, and W-phase output OSw is set at an active high setting. After respective phase outputs OSu, OSv, and OSw are thus set, voltages are applied to respective coil phases Uc, Vc, and Wc of brushless motor 1 in accordance with the respective phase outputs OSu, OSv, and OSw. Then, measurement times T11–T13 are set at the uppermost points of reference chopping wave BTW, power source current Idc is measured at two measurement times T11 and T12 sequential to each other. The measurement signals of DC current sensor 6 at respective measurement times T11 and T12 are A/D converted by A/D converter 7, and thereafter, they are stored in a memory (not shown) of control unit 5 as power source current data at respective measurement times T11 and T12.

Because at measurement time T11, U-phase output OSu and V-phase output OSv are high level and W-phase output OSw is low level, power source current Idc measured at the measurement time T11 becomes Idc=Iw (W-phase current), and the measurement of current at that time is accomplished at a center of the low level interval of W-phase output OSw. Further, because at measurement time T12, U-phase output OSu and W-phase output OSw are high level and V-phase output OSv is low level, power source current Idc measured at the measurement time T12 becomes Idc=Iv (V-phase current), and the measurement of current at that time is accomplished at a center of the low level interval of V-phase output OSv.

Next, respective phase currents Iu, Iv, and Iw are detected based on the power source current data stored in the memory. Because a chopping wave with a relatively high frequency in a range of about 5 kHz to about 20 kHz generally is used as a reference chopping wave BTW for PWM control, in this embodiment, measurement times T11 and T12 may be treated as an identical time and respective phase currents Iu, Iv, and Iw are detected at this time.

As describe above, because power source current Idc measured at measurement time T11 is W-phase current Iw and power source current Idc measured at measurement time T12 is V-phase current Iv, it is not necessary to determine the W-phase current Iw and V-phase current Iv by calculation. Further, because the sum of U-phase current Iu, V-phase current Iv, and W-phase current Iw always is zero, remaining U-phase current Iu may be derived by the equation of Iu=−Iv−Iw from the equation of Iu+Iv+Iw=0.

Because the number of setting times "N" at step S7 in FIG. 5 is set at 2, power source current Idc is measured successively at sequential two measurement times T13 and T14 (not shown), and respective phase currents Iu, Iv, and Iw are detected by treating the measurement times T13 and T14 as an identical time in a similar manner to that described above. In a motor drive control method due to PWM control, because there is also a control method for detecting only two currents among respective phase currents Iu, Iv, and Iw and using them, in such a control method, it is not necessary to calculate one remaining phase current Iu in the situation in which the other two phase currents Iv and Iw are recognized.

Further, because power source current Idc measured at measurement time T13 is U-phase current Iu, if power source current Idc is measured at three measurement times T11, T12, and T13, W-phase current Iw may be measured at measurement time T11, V-phase current Iv may be measured at measurement time T12 and U-phase current Iu may be measured at measurement time T13, respectively, and therefore, respective phase currents Iu, Iv, and Iw also may be detected at a time, when measurement times T11, T12, and T13 may be treated as identical, without calculation.

Although the embodiment for driving three-phase brushless motor 1 by inverter 2 has been described in detail above, the present invention may be applied to the detection of current of an inverter for driving a load, such as a motor including reluctance motor and an induction motor and transformer. In such configurations, advantages similar to those described above may be obtained.

Although the present invention has been described in connection with preferred embodiments, it will be understood by those skilled in the art that various modifications of the preferred embodiments described above may be made without departing from the scope of the invention. Other embodiments will be apparent to those skilled in the art from a consideration of the specification or from a practice of the invention described herein. It is intended that the specification and the described examples are considered exemplary only, with the true scope of the invention indicated by the following claims.

What is claimed is:

1. A current detection unit of an inverter comprising an inverter which outputs a pseudo, three-phase AC power, converted from DC power to a load, and means for measuring a DC current flowing in said inverter, said current detection unit detecting a three-phase current output from said inverter to said load by measuring said DC current flowing in said inverter, said current detection unit comprising:
   a measurement time setting means for setting a measurement time of said DC current at at least one of an uppermost point and a lowest point of a reference chopping wave with a predetermined frequency; and
   a current phase detection means for detecting at least two phase currents from respective DC currents measured at a plurality of measurement times sequential to each other.

2. The current detection unit of claim 1, further comprising an out put phase setting means for setting a three-phase output, wherein one phase is fixedly set at a low level or a high level, another phase is set at an active-high setting and a remaining phase is set at an active-low setting.

3. The current detection unit of claim 1, further comprising an output phase setting means for setting a three-phase output, wherein one phase is set at either an active-high setting or an active-low setting, and the other two phases are set at the other of said active-high setting and said active-low setting.

4. The current detection unit of claim 1, wherein said current phase detection means measures a DC current at two measurement times sequential to each other, detects one phase current from a current measured at one of said two measurement times, and detects another phase current from a current measured at the other measurement time.

5. The current detection unit of claim 1, wherein said current phase detection means measures a DC current at three or more measurement times sequential to each other, and estimates current phases, which are not detected at predetermined measurement times, based on currents measured at respective said measurement times.

6. The current detection unit of claim 2, wherein said current phase detection means detects a current phase, which is not measured at a predetermined measurement time, by inverting at least one phase output at said predetermined measurement time.

7. The current detection unit of claim 3, wherein said current phase detection means detects a current phase, which is not measured at a predetermined measurement time, by inverting at least one phase output at said predetermined measurement time.

8. The current detection unit of claim 2, wherein, by inverting at least one phase output at three measurement times sequential to each other, said current phase detection means detects a current phase, which is not measured at a second of said measurement time.

9. The current detection unit of claim 3, wherein, by inverting at least one phase output at three measurement times sequential to each other, said current phase detection means detects a current phase, which is not measured at a second of said measurement times.

* * * * *